United States Patent [19]

Greune et al.

[11] 4,018,045
[45] Apr. 19, 1977

[54] REGULATING DEVICE FOR A PRIME MOVER, MORE PARTICULARLY FOR A SINGLE-SPOOL GAS TURBINE

[75] Inventors: Christian Greune, Fürstenfeldbruck; Bruno Herrmann, Lambertheim; Siegfried Steuer, Unterhaching, all of Germany

[73] Assignee: Motoren- und Turbinen-Union Munchen GmbH, Germany

[22] Filed: Nov. 14, 1974

[21] Appl. No.: 523,801

Related U.S. Application Data

[63] Continuation of Ser. No. 265,478, June 23, 1972, abandoned.

[30] Foreign Application Priority Data

June 25, 1971 Germany .......................... 2331524

[52] U.S. Cl. .................. 60/39.28 R; 74/DIG. 5; 416/27
[51] Int. Cl.² .......................................... F02C 9/08
[58] Field of Search ............... 60/39.28 R, 39.16; 416/27, 28; 74/DIG. 5

[56] References Cited

UNITED STATES PATENTS

| | | | |
|---|---|---|---|
| 2,941,601 | 6/1960 | Best | 60/39.28 R |
| 3,078,670 | 2/1963 | Werner | 60/39.28 R |
| 3,095,701 | 7/1963 | Grosselfinger | 60/39.28 R |
| 3,097,700 | 7/1963 | Szydlowski | 60/39.28 R |
| 3,255,586 | 6/1966 | Hennig | 60/39.28 R |
| 3,266,248 | 8/1966 | Leslie | 60/39.28 R |
| 3,485,042 | 12/1969 | McLean | 60/39.28 R |

*Primary Examiner*—Clarence R. Gordon
*Attorney, Agent, or Firm*—Craig & Antonelli

[57] ABSTRACT

A regulating system for a prime mover, especially a single-spool gas turbine for use in propelling a motor vehicle or aircraft, in which system there is provided a first speed governor for controlling the fuel flow or input power and a second speed governor for controlling the power output. The two speed governors act concurrently in response to the speed of the prime mover and regulate the power input and power output independently of one another.

11 Claims, 6 Drawing Figures

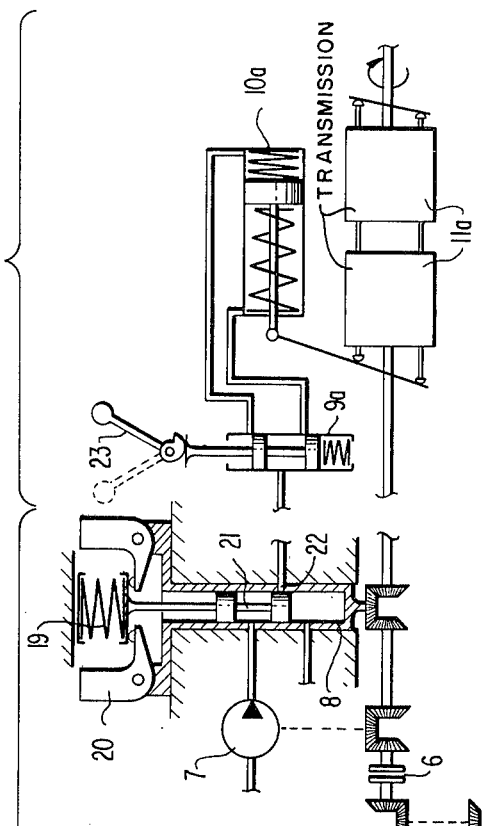
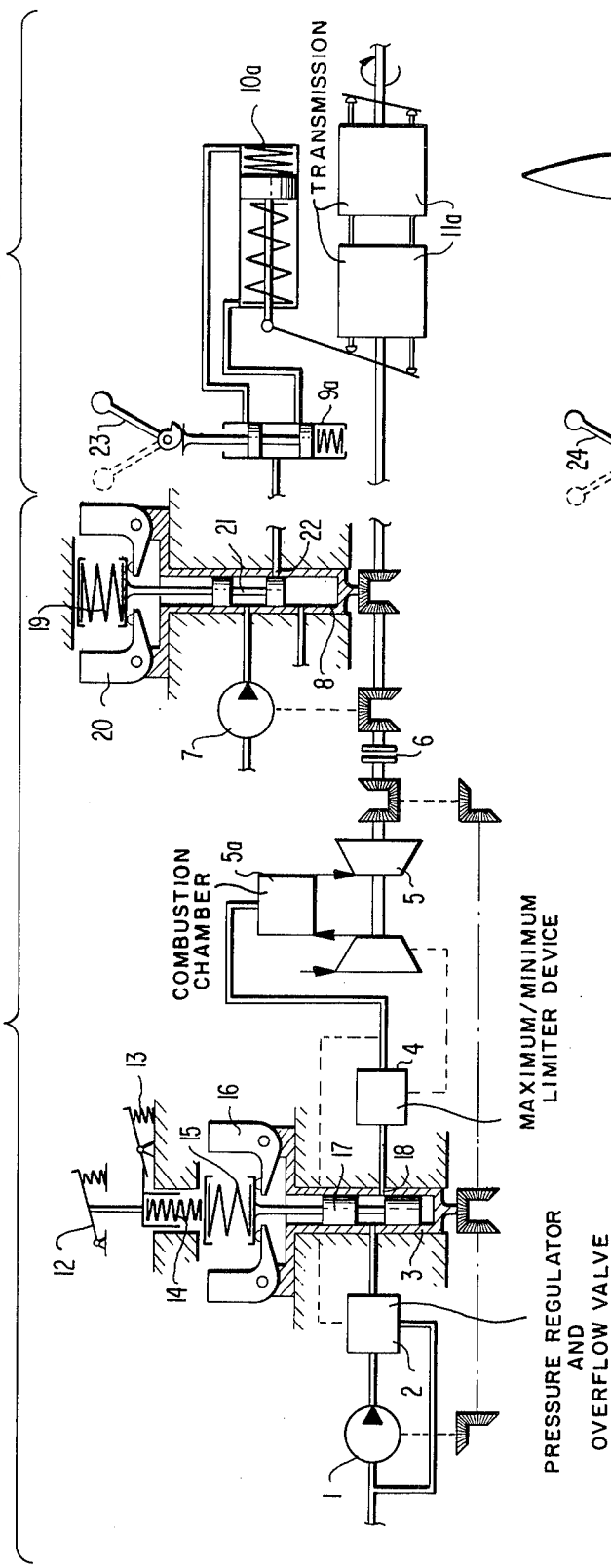

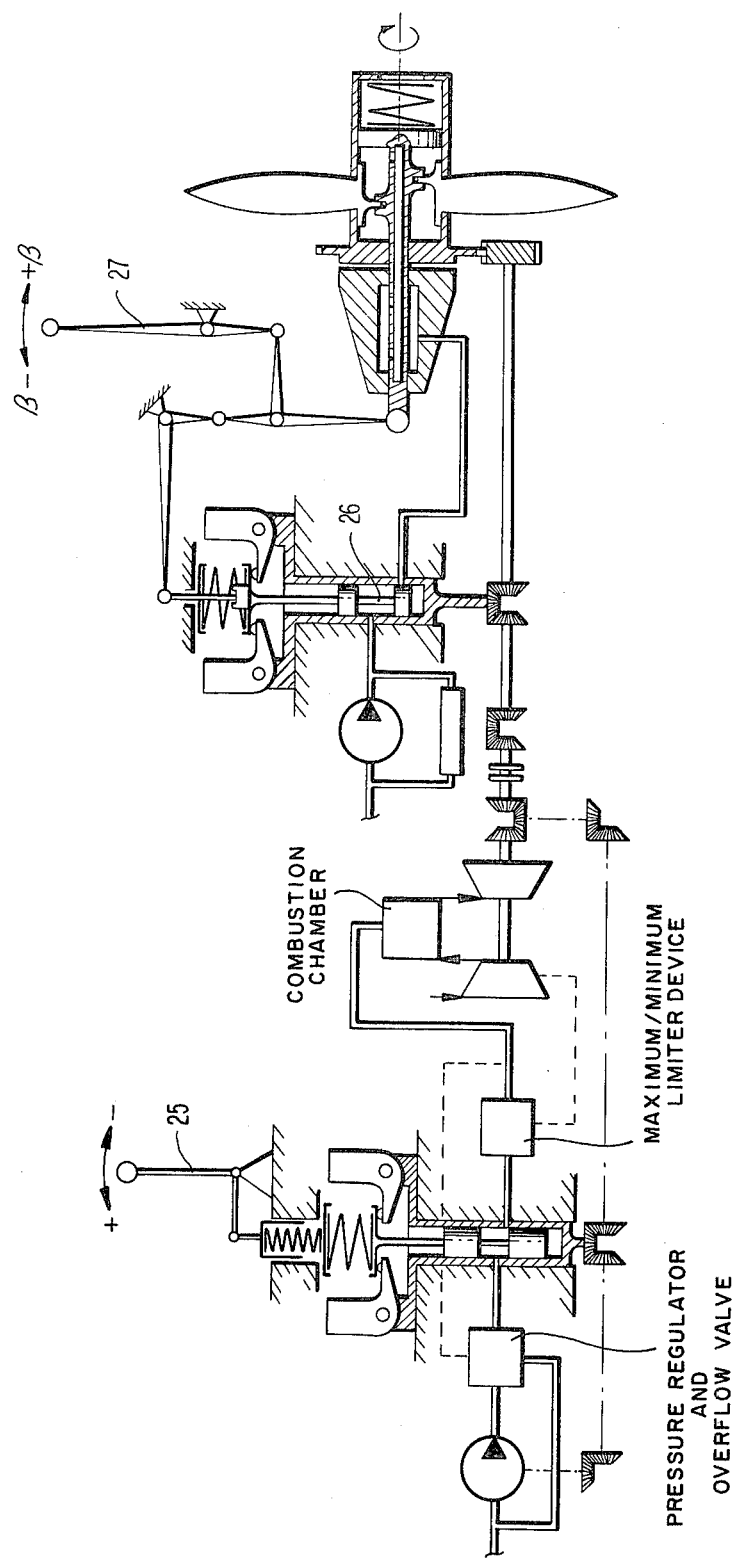

REGULATING DEVICE FOR A PRIME MOVER, MORE PARTICULARLY FOR A SINGLE-SPOOL GAS TURBINE

This is a continuation, of application Ser. No. 265,478 filed June 23, 1972, now abandoned.

This invention relates to a system or device for regulating a prime mover and more particularly to a system for regulating a single-spool gas turbine for use in propelling a motor vehicle or aircraft, wherein the system includes a speed governor for controlling the fuel flow.

In prior art systems, prime movers are conventionally fitted with a speed governor to stabilize their speeds under fluctuating loads. Constant speed is obtained by providing a system in which any disturbance of the balanced power condition causes a change in speed and thus provides the speed governor with a signal for increasing or decreasing the fuel flow and thereby the input power. Additionally, arrangements are known wherein the speed governor operates to regulate the power output in order to stabilize the prime mover speed. This latter system is generally utilized in conjunction with, for example, aircraft combustion engines connected with propellers, where the speed governor is employed to vary the pitch of the propeller blades to conform the power output with the commonly pilot-selected power input.

Both of the above-noted systems and methods of regulation have their specific disadvantages. In particular, when the first system is utilized, the externally imposed load may exceed the capacity of the prime mover and overload it, whereas the utilization of the latter system and method avoids the possibility of overloading. However, this latter system does not avoid certain operating conditions which may still cause overspeeding. For example, overspeeding of the prime move may result when the power consuming device or load (airframe or motor vehicle proper) begins to supply power rather than consume it. This condition exists when an aircraft utilizes the propeller at a given blade angle to function as a passive brake to promote rapid rates of decent, or when an engine is put to use for retarding a motor vehicle as on long downgrades.

In systems utilizing gas turbines for propulsion, it is a basic desire to avoid overspeeding and the attendant excessive loading of the blade material. However, considering the fact that single-spool gas turbines will not give substantial amounts of power until they have reached the nominal speed range, it is equally desirable that their normal operating speed be maintained as near as practicable.

It is therefore an object of the present invention to provide a regulation device for a prime mover which overcomes the disadvantages of prior art devices.

It is another object of the present invention to provide a regulating device for governing a prime mover so that the speed as well as the load selected by the input governor may be maintained without positive or negative fluctuations.

It is a further object of the present invention to provide a regulating device having a first speed governor for controlling fuel flow and a second speed governor which influences the power output, the two concurrently acting speed governors being responsive to engine speed, whereby their actuating members regulate the power input and the power output, respectively, independently of one another.

In accordance with the present invention there is provided a regulating device for a prime mover including two speed governors, one of which regulates the power input while the other regulates the power output. The two governors act concurrently and independently for eliminating the above-cited disadvantages found in conventional regulating devices.

These and further features, objects and advantages of the present invention will become more apparent from the following description when taken in conjunction with the accompanying drawings which show, for purposes of illustration only, several embodiments of the present invention and wherein:

FIG. 1 is a schematic representation of an embodiment of a regulating device in accordance with the present invention with FIGS. 1a and 1b illustrating the utilization of the regulating device for a motor vehicle and an aircraft, respectively;

FIG. 3 is a schematic representation of another embodiment of a regulating device for use with a turbo-prop engine.

Figure 2:
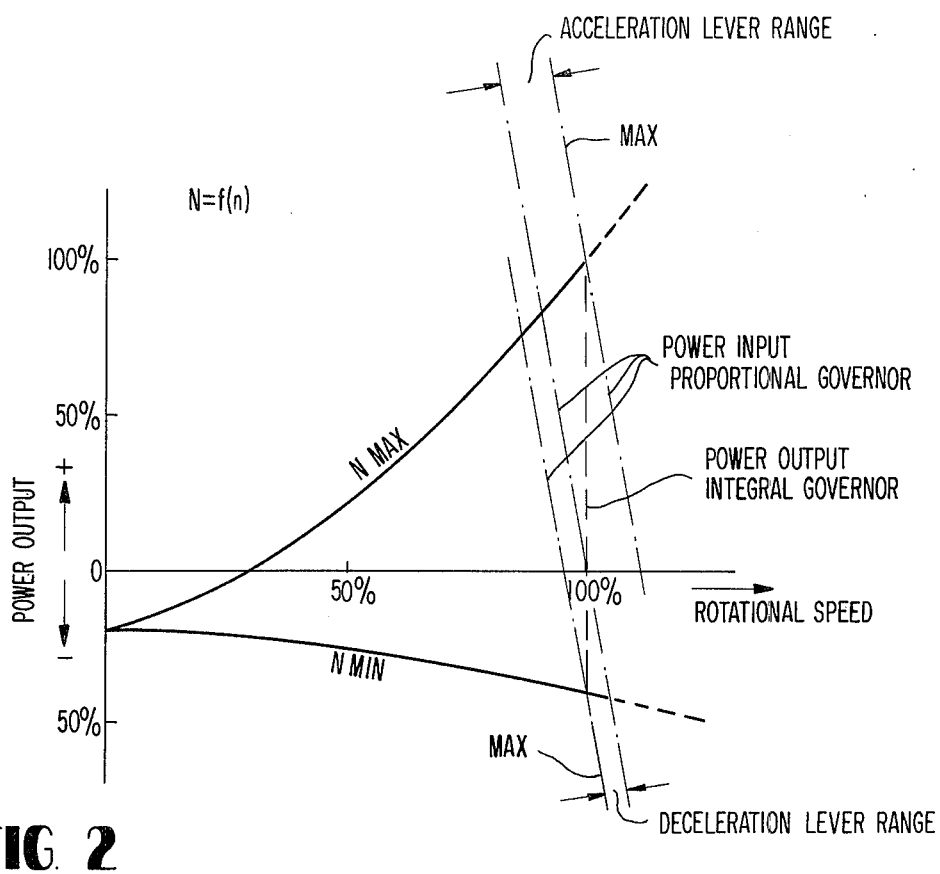
FIG. 2 is a power versus speed graph in which are plotted the characteristic curves of the respective governors controlling the power input and power output.

Referring now to the drawings, there is shown in FIG. 1 a regulating system for a prime mover including a fuel pump 1 delivering fuel under pressure to a pressure regulator and overflow valve 2. The valve serves to stabilize the differential pressure across a throttle 18 and a maximum/minimum limiter device 4 which limits the fuel flow within the known limits of the system. The fuel flows from the valve 2 to the control valve 17. The valve includes a piston, the movement of which is conditioned by the equilibrium resulting from the interacting forces of flyweights 16 and springs 14 and 15. The main spring 15 serves as a constant force while the force of the spring 14 is adjusted positively through the accelerator 12 to increase the flow and negatively through the decelerator 13 to decrease it. The fuel issuing through the throttle 18 arranged in the control sleeve 3 of the governor is thus proportional to the sum of the engine speed and the accelerator or decelerator position. After passing through the maximum/minimum fuel flow limiter 4, which controls the fuel flow in accordance with the engine limits, the fuel enters the combustion chamber 5a, is transformed into shaft horsepower in the turbine 5, and transmitted to a hydrostatic transmission in a motor vehicle (FIG. 1a) or to a propeller (FIG. 1b) through a coupling 6.

As shown in FIGS. 1a and 1b the output governor operates to vary, through a separate oil-actuated servo-mechanism, the ratio of the transmission 11a or the pitch of the propeller 11b so that the speed and hence the load selected by the input governor may be maintained without positive or negative fluctuations or deviations. This is achieved with the aid of an oil pump 7 the output pressure of which is controlled by means of the valving piston 21 in dependence upon the speed difference in unit time sensed by the spring and flyweight pendulum 19, 20 through the throttle 22 in the control sleeve 8 of the governor and on to the single-acting cylinder 10a and 10b in accordance with the output device utilized. The cylinders 10a and 10b are made reversible with the aid of changeover means 9a and 9b operated by selector levers 23 and 24, respectively, to permit both forward and reverse motion of a motor vehicle or, in the case of an aircraft, both positive and negative thrust. Thus, there is provided a first governor for influencing the fuel flow or input power and a second governor for influencing the power output which operate independently of one another.

Figure 2 is a graph of power versus speed on which are plotted the characteristic curves of the respective governors controlling the power input and output in accordance with the present invention, as well as curved of the accelerator range and the decelerator range. As shown by the characteristic curves, the input governor is a proportional action type and the output governor is an integral action type. However, the output governor can also be a proportional type, or the nominal speed value can be the same magnitude and adjustable simultaneously and in the same sense or direction for both governors.

FIG. 3 is another embodiment of the present invention for use with a turbo-prop engine. In contradistinction to the embodiment of FIG. 1 the accelerator 12 and the decelerator 13 are in this embodiment combined into a thrust lever 25. Additionally, a β-selector lever 27 is provided for manually overriding the output control valve 26 of the governor. However, the output governor remains operatively engaged in order to avert overloading.

Figure 4:
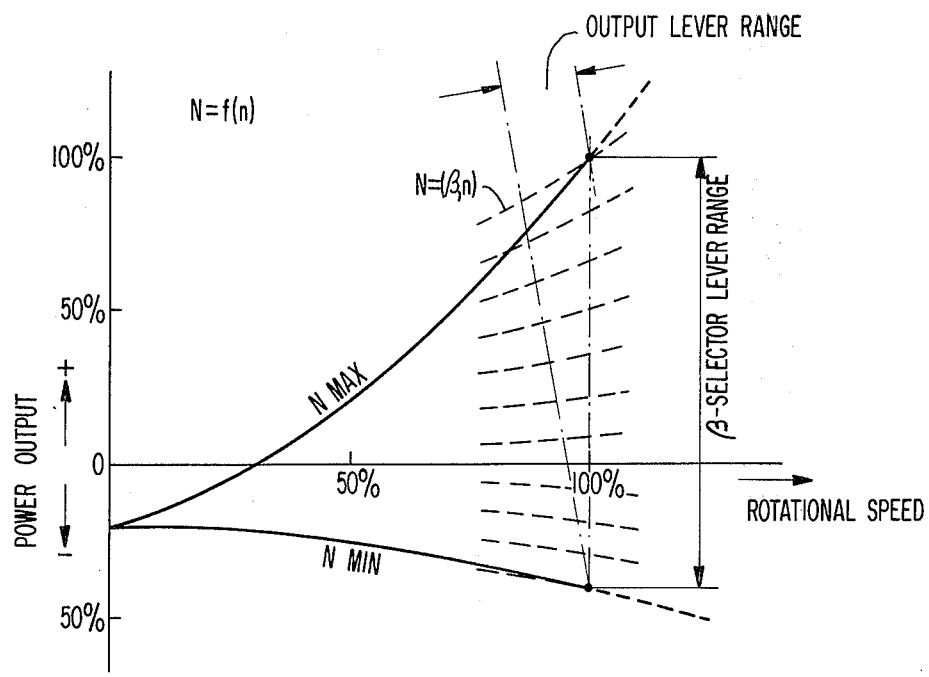
FIG. 4 is a power versus speed graph, wherein several characteristic curves relating to aircraft applications are plotted.

FIG. 4 is a graph of power versus speed on which are plotted several characteristic curves relating particularly to aircraft applications. The arrangement of FIG. 3 operates in a similar manner to that of FIG. 1, except that the blade angle β can additionally be used to bias the power output in this arrangement.

Obviously, many modification and variations of the present invention are possible in the light of the above teachings. It should therefore be understood that within the scope of the appended claims, the invention may be practiced otherwise than as specifically described.

We claim:

1. System for regulating a prime mover for propelling a vehicle in which the prime mover includes means providing fuel therefore and means providing a speed signal indicative of the speed of the prime mover, the regulating system comprising a first governor operatively connected with said speed means and directly responsive to the speed signal thereof for continuously controlling the flow of fuel to regulate the power input of the prime mover independently of other operating parameters of the prime mover over at least a predetermined range of the other operating parameters of the prime mover, and a second governor operatively connected with said speed means and directly responsive to the speed signal thereof for regulating the load of the prime mover, said first and second speed governors operating concurrently and independently of one another over the entire operating range of the prime mover.

2. System according to claim 1, wherein said first and second governors are proportional speed governors.

3. System according to claim 1, wherein one of said first and second governors is a proportional speed governor and the other of said first and second governors is an integral speed governor.

4. System according to claim 1, further comprising means for manually overriding the output control of said second governor, said second governor remaining operatively engaged with said prime mover for limiting the load thereon.

5. System according to claim 1, wherein the nominal speed values of said first and second governors are simultaneously adjustable in the same sense.

6. System according to claim 1, wherein said second governor includes servomechanism means for controlling the load of the prime mover.

7. System according to claim 6, wherein said servomechanism means includes a reversible single acting cylinder, said cylinder being reversible in accordance with one of the direction of motion and thrust of the propelled vehicle.

8. System according to claim 1, wherein said prime mover includes a gas turbine having a compressor, a combustion chamber receiving the fuel regulated by said first governor, and a power turbine, said speed means providing a speed signal of the output speed of said power turbine to said first and second governors.

9. System according to claim 8, wherein said gas turbine is a single spool gas turbine, said power turbine having an output shaft, and said speed means providing the speed signal indicative of the rotational speed of said output shaft.

10. System according to claim 9, further comprising transmission means coupled to said output shaft of said power turbine, said second governor including servomechanism means for controlling the ratio of said transmission means for regulating the load of the prime mover.

11. System according to claim 9, wherein the vehicle is an aircraft, and further comprising propeller means coupled to said output shaft of said power turbine, said second governor including servomechanism means for controlling the pitch of the propeller means for regulating the load of the prime mover.

* * * * *